United States Patent [19]

Bartholomew

[11] Patent Number: 5,001,305
[45] Date of Patent: Mar. 19, 1991

[54] HOLDER TO PROVIDE PULL STRENGTH AND LIMIT BEND RADIUS OF BRITTLE CONDUCTORS

[75] Inventor: Donald D. Bartholomew, Marine City, Mich.

[73] Assignee: Proprietary Technology, Inc., Southfield, Mich.

[21] Appl. No.: 465,468

[22] Filed: Jan. 16, 1990

[51] Int. Cl.$^5$ .......................... H02G 1/00; H02G 3/04
[52] U.S. Cl. ........................................ 174/136; 29/423;
29/599; 53/409; 53/430; 138/114; 138/174;
174/10; 174/15.5
[58] Field of Search ................. 174/10, 15.5, 28, 68.3,
174/70 R, 136; 138/112, 113, 114, 132, 174;
29/599, 423; 53/409, 430; 206/328

[56] References Cited

U.S. PATENT DOCUMENTS 3,924,632  12/1975  Cook ............................... 138/132 X
4,308,895   1/1982  Greco .............................. 138/132 X
4,554,650  11/1985  Brown et al. ..................... 138/174 X

FOREIGN PATENT DOCUMENTS 920519  2/1973  Canada ................................ 138/112

Primary Examiner—Laramie E. Askin
Attorney, Agent, or Firm—Harness, Dickey & Pierce

[57] ABSTRACT

A holder for protection and handling of a brittle electrical conductor element, such as a ceramic superconductor, limited in its ability to withstand tensile and compression forces exerted thereon and bending along its axial length beyond a predetermined arcuate path. The holder has a flexible housing which encompasses and protects the superconductor element. A helically disposed strengthening element is integral with the housing. The strengthening element resists tensile forces exerted on the housing in an axial direction and resists radially imposed forces on the housing isolating the superconductor element from these forces. The strengthening element also provides for limited arcuate bending of the housing for limiting the bending beyond a predetermined arcuate path.

9 Claims, 1 Drawing Sheet

HOLDER TO PROVIDE PULL STRENGTH AND LIMIT BEND RADIUS OF BRITTLE CONDUCTORS

BACKGROUND AND SUMMARY OF THE INVENTION

The present invention relates to a holder for protection and handling of a brittle conductor. More particularly, the present invention relates to a holder for brittle superconductor elements.

Materials, such as ceramics, used in superconductor compositions have generally been found lacking in certain desirable physical properties; for example, they are brittle and lack tensile strength. This results in sensitivity of these materials to pulling and bending forces Thus, while these materials may some day revolutionize the conducting of electric power and the electronics and communications industries, it will be necessary to provide a holder which will protect and facilitate the handling and deployment of these relatively brittle conductors in buildings, and in underground or overhead installations.

During installation or manufacturing of these types of conductors, it is often necessary to impose various forces on the conductors during routing of the conductors Thus, conductors in use today are commonly pulled or pushed through conduits, and curved or bent during handling These forces, stresses and strains of normal handling, while fairly harmless to conventional conductors, could easily result in damage to a ceramic superconductor element.

Therefore, to commercialize ceramic superconductors in such installations, it is necessary to provide a holder which could protect such an element from the various stresses inherent in these installations.

Such a holder must, to be efficient in this use, not adversely interfere with the desirable properties of the ceramic superconductor elements or interfere with the necessary operating environment, while protecting the ceramic superconductor element from adverse handling conditions. Thus, the materials used in such a holder should be a poor conductor of heat and electricity, provide excellent tensile strength, be sufficiently resistant to bending and compression and be chemically unaffected by any cooling media utilized with the superconductor element, or material that would adversely affect the superconductor element.

Such a holder could advantageously provide an intimately associated conduit for a ceramic superconductor element or could be utilized in a larger conduit which may circulate cooling medium about the holder and superconductor element.

It is an object of the present invention to provide a holder for a ceramic superconductor element which will protect and insulate the superconductor element from forces encountered during handling and installation of the superconductor element, such as tensile forces due to pulling and pushing or bending of the holder and compressive forces imparted on the assembly.

It is still further an object of the present invention to provide such a holder which will provide an adequate electrical and operating environment for the superconductor element.

It is a further object of the present invention to provide such a holder which will support the superconductor element in a temperature controlled environment for assisting in the temperature control of the superconductor element conduit.

It is still further an object of the present invention to provide a holder, that is used during the manufacture of the superconductor element, to reduce the amount of mechanical forces which must be withstood by the superconducting material.

In accordance with the above objectives there is provided in the present invention a holder for protection and handling of a brittle conductor. The holder includes a flexible housing for encompassing and protection of the brittle conductor and a means integral with the housing for resisting and isolating the brittle conductor from tensile forces exerted in an axial direction, from radially imposed forces and for providing a predetermined limited arcuate bending of the housing.

Additional benefits and advantages of the present invention will become apparent to those skilled in the art from the subsequent description of the invention and the appended claims taken in conjunction with the accompanying drawings.

DETAILED DESCRIPTION OF THE INVENTION

Figure 1:
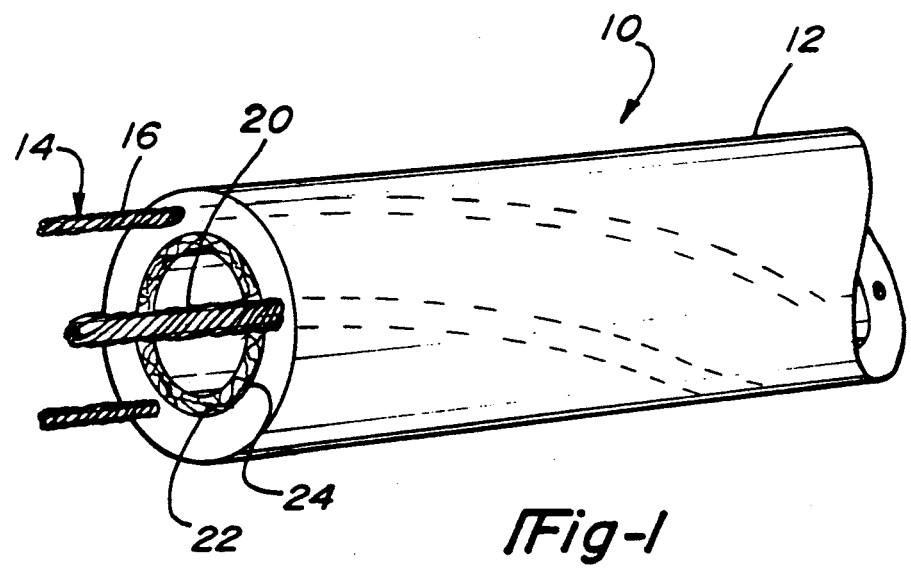
FIG. 1 is a perspective view, partially broken away and in phantom, showing a brittle conductor holder made in accordance with the teachings of the present invention.

According to the present invention there is provided a holder 10 for protection and handling of a brittle superconductor element. The holder 10 includes a flexible housing 12 for encompassing and protection of the brittle superconductor (not shown). The housing 12 includes a means 14 integral with the housing for isolating the brittle superconductor from and for resisting of tensile forces exerted in an axial direction, for protection and isolation from radially imposed forces and for providing limited arcuate bending of the housing 12. This means preferably includes at least one strengthening element 16 helically disposed and embedded in the housing as shown in FIG. 1. The strengthening element may be a single strand 16 or, depending on the amount of strengthening or reinforcement necessary, it could include a multilayer wound strand element or a combination of several different elements such as 20. The helical disposition in combination with the integral attachment of the element to the housing reinforces the housing to resist axial tensile forces on the housing, to resist compressive forces on the housing (whether due to the tensile forces or due to tensile and compression from bending) and also to resist radially imposed forces on the housing. Additionally, the helically wound strengthening element disposed in the housing limits the available bending of the housing to a predetermined radial arc.

The housing 12 must be made of a material which is somewhat flexible, resilient and durable for the initial use in the installation. The housing must also be relatively inert with respect to the superconductor environment. Thus, the material utilized must be able to withstand the temperatures associated with the particular superconductor element without significant deterioration and not adversely affect or be adversely affected by the cooling medium used. Suitable materials which may be utilized as the housing material include low temperature operating polymers that do not undergo destruction at the high magnetic fields that would exist about the superconductor.

The strengthening element likewise must retain its structural integrity through installation, and not significantly deteriorate in the temperatures and environment necessitated by the particular superconductor element and be compatible with the housing material used. Fiberglass strengthening elements could be advantageously utilized in the present invention. Suitable materials for use as strengthening elements include the family of low loss glass fibers.

It is preferable that to provide a useful environment for the superconductor, the materials utilized should be non-conductive of heat and electricity. For purposes herein non-conductivity shall refer to a conductivity of less than 5,000 ohms per square centimeter.

Figure 2:
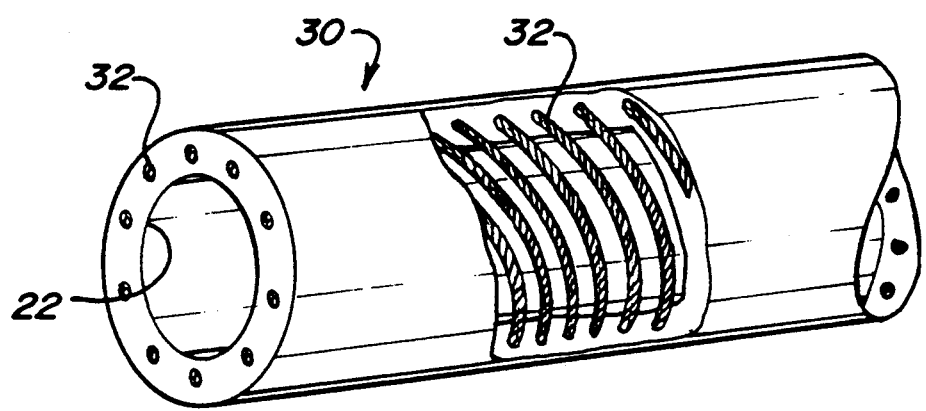
FIG. 2 is a perspective view, partially broken away, showing an alternate embodiment of the brittle conductor holder of the present invention.

FIG. 2 shows an alternate embodiment of holder 30 with strengthening elements 32 which are wound in a relatively large helical angle to provide added crush strength. More than one layer of these strengthening elements may be desirable for further strengthening the holder and limiting the bending of the holder in certain situations, and can be accomplished by winding the strengthening elements in opposite helical directions The space between elements 32 and the helical angle chosen may be selected to control the resistance to bending as required in a particular application The materials described above would be equally suitable in this embodiment.

Figure 3:
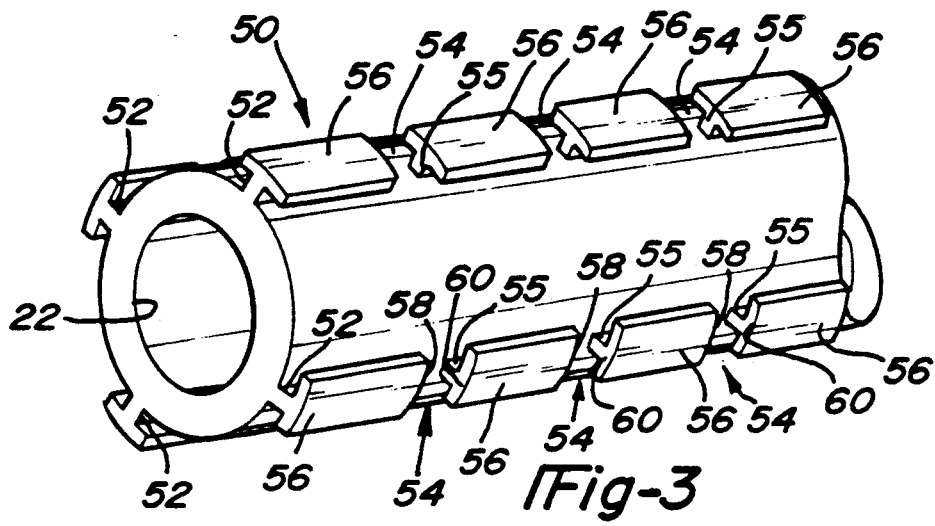
FIG. 3 is a perspective view, partially broken away, of an alternate embodiment of the present invention showing a means for limiting the bending of the conduit and for ensuring flow of a cooling medium about the holder.

FIG. 3 shows a means of preventing holder 50 from lying adjacent to the interior wall of a temperature controlling medium confining conduit (not shown) In the present invention it is desirable to provide an environment suitable for a superconductor element As superconductor elements commonly require exposure to a cooling medium, the embodiment as shown in FIG. 3 provides a construction which allows coolant to flow about substantially the entire periphery of the housing. This is accomplished by separating the housing from the walls of the outer conduit which circulates a coolant fluid about the superconductor element for proper temperature control. According to this embodiment a series of radially extending fins 52 are provided for separating the housing from the outer conduit. Preferably the fins are disposed at 90° angles along the periphery of the housing. In the embodiment shown, the fin members include cut-away portions 54 to form arms 55 at spaced intervals to retain the limited flexibility of the housing. However, other configurations such as helically arranged rib members could be provided which would provide the same function. The fins may be of a T shape having portions 56 attached at the terminal end which provides further strengthening of the fins. The cut-out portions 54 may also be utilized to further reinforce the limited bending of the housing in that upon bending of the housing, contiguous edges 58, 60 of the arms 55 will interfere after a predetermined arcuate bending, thus, limiting the bending of the housing. The amount of bending allowed may be adjusted according to the distance between the arms 56. The arms 56 are attached to the tubular body of holder 50 by thin fins to limit the heat flow into the interior of the holder 50.

It is preferable that the interior 22 of the holders 10, 30 or 50 include a low friction coating 24 therein to facilitate ease of insertion of the conductor into the holder. This coating may be formulated from any of the known low friction fluorocarbons such as Teflon ® is a registered trademark of DuPont, a Delaware corporation). It is emphasized that FIGS. 1, 2 and 3 are meant to illustrate the preferred embodiments for fulfilling the aforementioned objectives so that a holder for a brittle superconductor element, which will carry the relatively easily damaged superconductor element, can be fabricated which will provide an advantageous method by which such superconductor elements may be used in the field and manufactured.

Thus, utilizing the holder of the present invention, a superconductor element could be prepackaged in the holder. The superconductor element could be inserted into the holder at the factory. Thereafter, the holder and superconductor element could be coiled to the allowable extent as determined by the holder and shipped for installation as a unit at the site.

Alternatively, the holder could initially be employed in a suitable installation. This will provide a "friendly" path for the superconductor element since the holder will bend only to a predetermined limited extent as mandated by the particular superconductor element utilized ensuring that the curved path defined will not exceed the limits of the superconductor element. Because of the crush resistance of the holder, the holder will also provide a suitably dimensioned opening throughout its path because of the relative crush resistance provided by the present invention. Thereafter, the superconductor element may be routed through the holder and it is ensured that the bends will not be such as to encumber the path of the superconductor element.

While the above description constitutes the preferred embodiment of the present invention, it is to be appreciated that the invention is susceptible to modification, variation and change without departing from the proper scope and fair meaning of the accompanying claims.

What is claimed is:

1. A holder for protection and handling of an electrical brittle conductor element limited in its ability to withstand tensile and compression forces exerted thereon and bending along its axial length beyond a predetermined arcuate path, said holder comprising:

a flexible housing means for encompassing and protection of said conductor element;

a means integral with said housing means for resisting tensile forces exerted on said housing means in an axial direction and for resisting radially imposed forces on said housing means for thereby isolating the conductor element from such forces, a plurality of fin means radially extending from said flexible housing means, said fin means being arranged to provide interference between adjacent fin means during arcuate bending of said housing means for providing a predetermined limited arcuate bending of the housing means for protecting the conductor element from bending beyond said predetermined arcuate path.

2. The holder of claim 1 wherein said housing means further comprises a polymer sleeve member having a central opening and said means integral with said housing means further comprises at least one helically disposed strengthening element embedded in said housing means.

3. The holder of claim 1 wherein said housing means further comprises a polymer sleeve member having a central opening for intimately encompassing said conductor element and said means integral with said housing means further comprises a plurality of strengthening elements helically disposed integrally with said housing means.

4. The holder of claim 1 wherein said radially extending fin means are spaced about the periphery of said housing means for separating said housing means from an external conduit surface for allowing a coolant fluid to pass therebetween.

5. The holder of claim 1 wherein said housing means further comprises a tubular housing and said means integral with said housing means further comprises at least one strengthening element helically disposed in said tubular housing for providing resistance against said tensile forces and said radially imposed forces and said plurality of fin means further comprises at least three rows of a plurality of axially spaced aligned radially extending rib members, said rows being disposed about the periphery of said tubular housing, said rib members providing interference between one another upon bending of said tubular housing for limiting of the arcuate bending of said tubular housing.

6. A holder for protection and handling of a brittle electrical conductor element limited in its ability to withstand tensile and compression forces exerted thereon and also bending along its axial length beyond a predetermined arcuate path, said holder comprising:

a flexible tubular housing for encompassing and protection of said conductor element;

at least one helically disposed strengthening element integral with said housing, said strengthening element being for strengthening of said housing against compression due to tensile forces exerted on the housing or due to curvature and bending of the housing;

a plurality of radially extending fin members disposed about the periphery of said housing, each of said fin members having spaced cut-out portions defining separate rib members having discrete pairs of contiguous edges for providing interference between said contiguous edges in response to bending of said housing for limiting of the arcuate bending of said housing, said fin members also acting to space the housing from the wall of an external conduit thereby allowing a coolant fluid to freely pass about the outer periphery of the housing.

7. The holder of claim 6 further comprising at least three of said radially extending fin members extending from said housing.

8. A method for packaging a superconductor element for insertion in a conduit comprising the steps of:

(a) providing a predetermined length of a superconductor element holder for protection and isolation of said superconductor element from undesirable forces imposed thereon, said holder including a central opening for insertion of said superconductor element, said holder including a flexible housing and a means integral with said housing for resisting and isolating of the superconductor element from tensile forces and compressive forces imposed on said housing, and for providing a predetermined limited arcuate bending of the housing, said holder being disposed in a substantially uncoiled form;

(b) inserting a predetermined length of a superconductor element into said central opening of said holder;

(c) coiling the superconductor element disposed in the holder to the extent provided by said predetermined limited arcuate bending of said housing; and (d) temporarily maintaining the product of step (c) in its coiled form.

9. A holder for protection and handling of a brittle electrical conductor element limited in its ability to withstand tensile and compression forces exerted thereon and also bending along its axial length beyond a predetermined arcuate path, said holder comprising:

a flexible tubular housing for encompassing and protection of said conductor element;

at least one helically disposed strengthening element integral with said housing, said strengthening element being for strengthening of said housing against compression due to tensile forces exerted on the housing or due to curvature and bending of the housing;

at least three radially extending T-shaped fin members disposed about the periphery of said housing, each of said fin members having spaced cut-out portions defining separate axially spaced T-shaped rib members, the outer portion of adjacent T-shaped rib members forming discrete pairs of contiguous edges for providing interference between at least a portion of said contiguous edges of adjacent T-shaped rib members in response to bending of said housing for limiting of the arcuate bending of said housing, said fin members also acting to space the housing from the wall of an external conduit thereby allowing a coolant fluid to freely pass about the outer periphery of the housing.

* * * * *

UNITED STATES PATENT AND TRADEMARK OFFICE
CERTIFICATE OF CORRECTION

PATENT NO. :  5,001,305

DATED : Mar. 19, 1991

INVENTOR(S) : Donald D. Bartholomew

It is certified that error appears in the above-identified patent and that said Letters Patent is hereby corrected as shown below:

Col. 1, Line 27, "conductors" should be --conductors.--;

Col. 1, Line 29, "handling" should be --handling.--;

Col. 3, Line 33, "directions" should be --directions.--;

Col. 3, Line 41, "shown)" should be --shown).--;

Col. 3, Line 43, "element" should be --element.--;

Col. 4, Line 8, before "is" insert --(Teflon--.

Signed and Sealed this

Twenty-ninth Day of June, 1993

Attest:

MICHAEL K. KIRK

*Attesting Officer*  *Acting Commissioner of Patents and Trademarks*